(12) United States Patent
Tsaur (10) Patent No.: US 9,372,760 B1
(45) Date of Patent: Jun. 21, 2016

(54) SYSTEMS AND METHODS FOR SECURELY STORING BACKUP DATA WHILE FACILITATING FAST FAILOVERS

(71) Applicant: Ynn-Pyng Anker Tsaur, Oviedo, FL (US)

(72) Inventor: Ynn-Pyng Anker Tsaur, Oviedo, FL (US)

(73) Assignee: Veritas Technologies LLC, Mountain View, CA (US)

( * ) Notice: Subject to any disclaimer, the term of this patent is extended or adjusted under 35 U.S.C. 154(b) by 219 days.

(21) Appl. No.: 13/656,536

(22) Filed: Oct. 19, 2012

(51) Int. Cl.
*G06F 11/00* (2006.01)
*G06F 11/14* (2006.01)
*H04L 29/14* (2006.01)

(52) U.S. Cl.
CPC ............ *G06F 11/1458* (2013.01); *G06F 11/14* (2013.01); *G06F 11/1448* (2013.01); *H04L 69/40* (2013.01)

(58) Field of Classification Search
CPC . G06F 11/14; G06F 11/1448; G06F 11/1458; G06F 11/2025; H04L 69/40; H04L 67/1097
See application file for complete search history.

(56) References Cited

U.S. PATENT DOCUMENTS

| | | | | |
|---|---|---|---|---|
| 6,023,506 A * | 2/2000 | Ote et al. | | 713/165 |
| 7,444,502 B2 * | 10/2008 | Hatasaki | G06F 9/4401 | 713/1 |
| 2008/0165957 A1 * | 7/2008 | Kandasamy | G06F 21/6218 | 380/44 |
| 2009/0216975 A1 * | 8/2009 | Halperin | G06F 9/45537 | 711/162 |
| 2010/0011178 A1 * | 1/2010 | Feathergill | | 711/162 |
| 2010/0077160 A1 * | 3/2010 | Liu et al. | | 711/162 |
| 2010/0107158 A1 * | 4/2010 | Chen | G06F 11/1438 | 718/1 |
| 2011/0276806 A1 * | 11/2011 | Casper | G06F 21/602 | 713/189 |

OTHER PUBLICATIONS

Creating Bootable Virtual Hard Disks, Microsoft Technet, Oct. 15, 2010.*
The New Standard for Data Protection, VEEAM 2010.*
L. Cox, C. Murray, B. Noble Pastiche: Making Backup Cheap and Easy, OSDI' 02.*
B. Gillson, Encryption and Disk Imaging—Part II, Symantec Encryption Blog, Apr. 8, 2009.*
B. Gillson, Encryption and Disk Imaging—Part I, Symantec Encryption Blog, Apr. 8, 2009.*
PGP Whole Disk Encryption Quick Start Guide, PGP Support Knowledge Base 2006.*
M. Liang, C. Chang, Research and Design of Full Disk Encryption Based on Virtual Machine, IEEE International Conference on Computer Science and Information Technology (ICCSIT), Jul. 2010.*
Shailesh Vaman Marathe et al.; Systems and Methods for Migrating Virtual Machines; U.S. Appl. No. 13/097,635, filed Apr. 29, 2011.
Soumya Tripathy et al.; Systems and Methods for Performing Fast Failovers; U.S. Appl. No. 13/404,998, filed Feb. 24, 2012.
Santosh Kalekar; Systems and Methods for Virtual Disk Usage Transparency; U.S. Appl. No. 13/364,290, filed Feb. 1, 2012.

* cited by examiner

Primary Examiner — Kevin Verbrugge
Assistant Examiner — Francisco Grullon
(74) Attorney, Agent, or Firm — ALG Intellectual Property, LLC (57) ABSTRACT

A computer-implemented method for securely storing backup data while facilitating fast failovers may include 1) identifying, at a primary site, a virtual disk file that includes a backup image, 2) modifying a boot sector within the virtual disk file to add a boot loader that supports reading disks encrypted with whole disk encryption, 3) encrypting the backup image within the virtual disk file, except for at least one decryption area, with whole disk encryption, and 4) storing the virtual disk file at a secondary site after encrypting the backup image within the virtual disk file. Various other methods, systems, and computer-readable media are also disclosed.

20 Claims, 6 Drawing Sheets

SYSTEMS AND METHODS FOR SECURELY STORING BACKUP DATA WHILE FACILITATING FAST FAILOVERS

BACKGROUND

In the digital age, organizations increasingly rely on digitally-stored data. To protect against data loss, an organization may use a backup system to back up important data. For example, an organization may create and store a disk image as a backup of a disk.

Business continuity and disaster recovery refers to the capability to restore normal (or near-normal) business operations, from a critical business application perspective, after the occurrence of a disaster that interrupts business operations. Business continuity and disaster recovery may require the ability to bring up mission-critical applications and the data these applications depend on and make them available to users as quickly as business requirements dictate.

In order to facilitate business continuity, some organizations may wish to use backup disk images within virtual machines in failover scenarios. However, security practices may prevent these organizations from copying unencrypted backup disk images to offsite locations. Unfortunately, decrypting encrypted backup disk images when failover situations arise may cost valuable time and undermine business continuity goals. Accordingly, the instant disclosure identifies and addresses a need for additional and improved systems and methods for securely storing backup data while facilitating fast failovers.

SUMMARY

As will be described in greater detail below, the instant disclosure generally relates to systems and methods for securely storing backup data while facilitating fast failovers by encrypting backup images on site and provisioning virtual disk files that include these encrypted backup images with boot loaders that support reading these encrypted backup images.

In one example, a computer-implemented method for securely storing backup data while facilitating fast failovers may include 1) identifying, at a primary site, a virtual disk file that includes a backup image, 2) modifying a boot sector within the virtual disk file to add a boot loader that supports reading disks encrypted with whole disk encryption, 3) encrypting the backup image within the virtual disk file, except for at least one decryption area, with whole disk encryption, and 4) storing the virtual disk file at a secondary site after encrypting the backup image within the virtual disk file.

In some examples, the backup image may include a backup of a disk at the primary site. In these examples, encrypting the backup image within the virtual disk file may include encrypting the backup image at the primary site. In some embodiments, the backup image may include a backup of the disk of a host system within the primary site. In these embodiments, encrypting the backup image within the virtual disk file may include encrypting the backup image at a media server at the primary site.

In one example, identifying the virtual disk file may include backing up an additional virtual disk file to create the virtual disk file. In one embodiment, identifying the virtual disk file may include backing up a physical host system at the primary site to create the backup image.

In some examples, the computer-implemented method may also include injecting an encryption disk driver into the virtual disk file. In some embodiments, the computer-implemented method may further include determining, based on a security standard, that the backup image is to be encrypted before transmitting the backup image outside the primary site. In these embodiments, encrypting the backup image may include encrypting the backup image is in response to determining that the backup is to be encrypted based on the security standard.

In one example, the computer-implemented method may further include 1) identifying a failover from the primary site to the secondary site and 2) in response to the failover, loading the backup image in a virtual machine at the secondary site.

In one embodiment, a system for implementing the above-described method may include 1) an identification module programmed to identify, at a primary site, a virtual disk file that includes a backup image, 2) a modification module programmed to modify a boot sector within the virtual disk file to add a boot loader that supports reading disks encrypted with whole disk encryption, 3) an encryption module programmed to encrypt the backup image within the virtual disk file, except for at least one decryption area, with whole disk encryption, and 4) a storage module programmed to store the virtual disk file at a secondary site after encrypting the backup image within the virtual disk file. In some examples, the system may also include at least one processor configured to execute the identification module, the modification module, the encryption module, and the storage module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify, at a primary site, a virtual disk file that includes a backup image, 2) modify a boot sector within the virtual disk file to add a boot loader that supports reading disks encrypted with whole disk encryption, 3) encrypt the backup image within the virtual disk file, except for at least one decryption area, with whole disk encryption, and 4) store the virtual disk file at a secondary site after encrypting the backup image within the virtual disk file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securely storing backup data while facilitating fast failovers. As will be explained in greater detail below, by encrypting backup images on site and provisioning virtual disk files that include these encrypted backup images with boot loaders that support reading these encrypted backup images, the systems and methods described herein may enable the secure offsite storage of backup images while simultaneously facilitating the use of these backup images for fast failovers.

Figure 1:
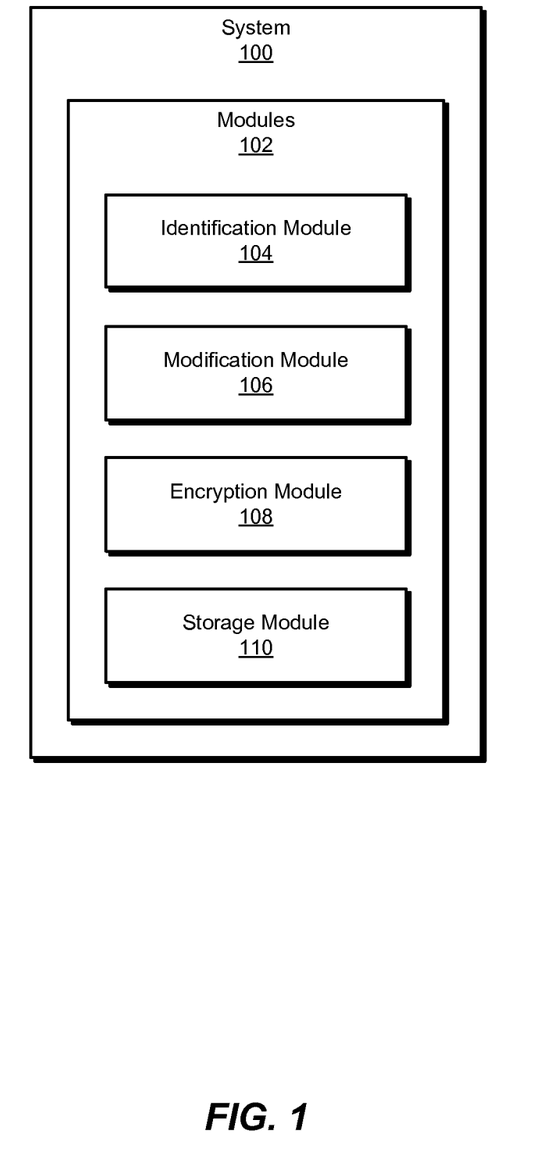
FIG. 1 is a block diagram of an exemplary system for securely storing backup data while facilitating fast failovers.
Figure 2:
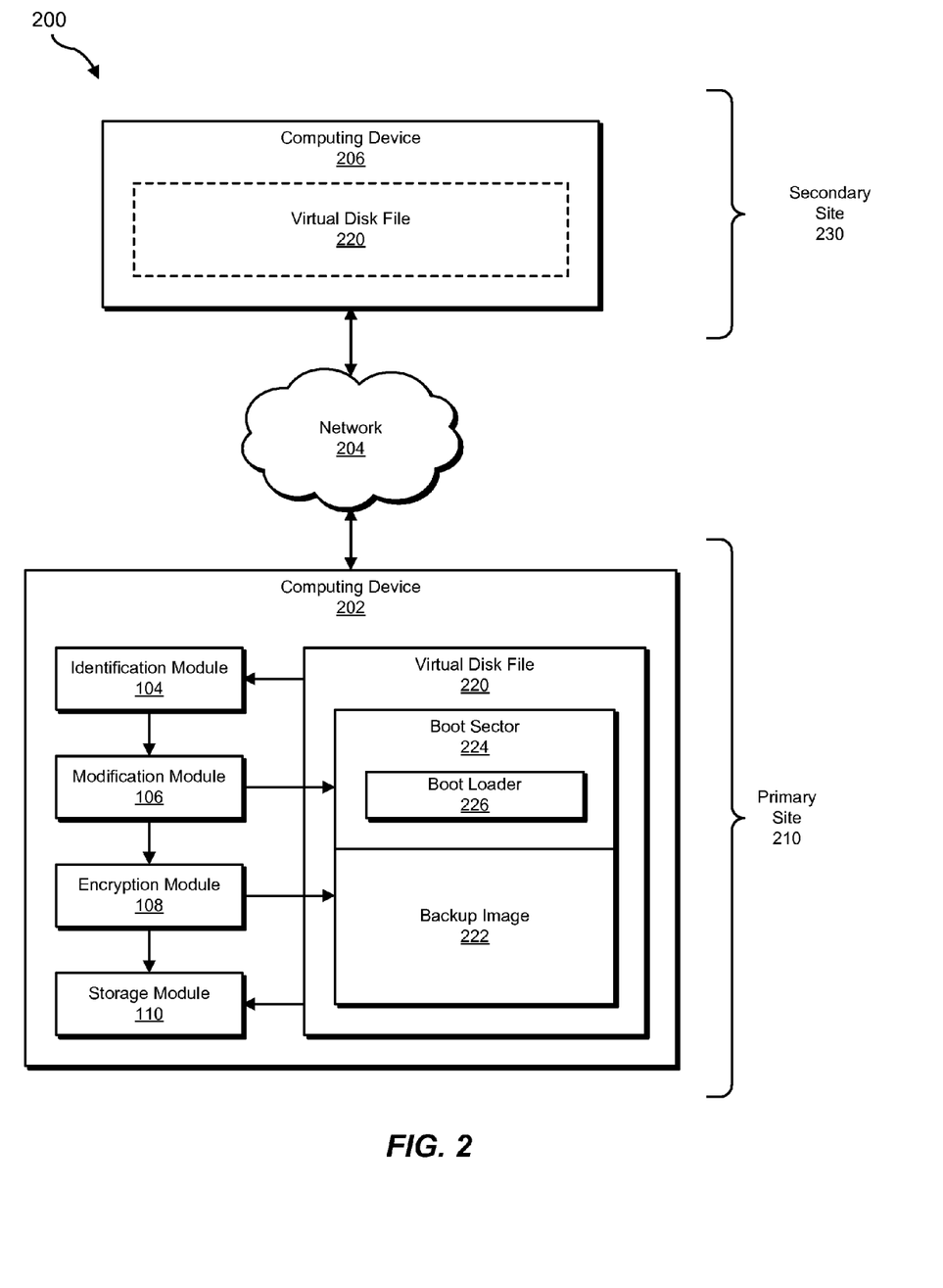
FIG. 2 is a block diagram of an exemplary system for securely storing backup data while facilitating fast failovers.
Figure 3:
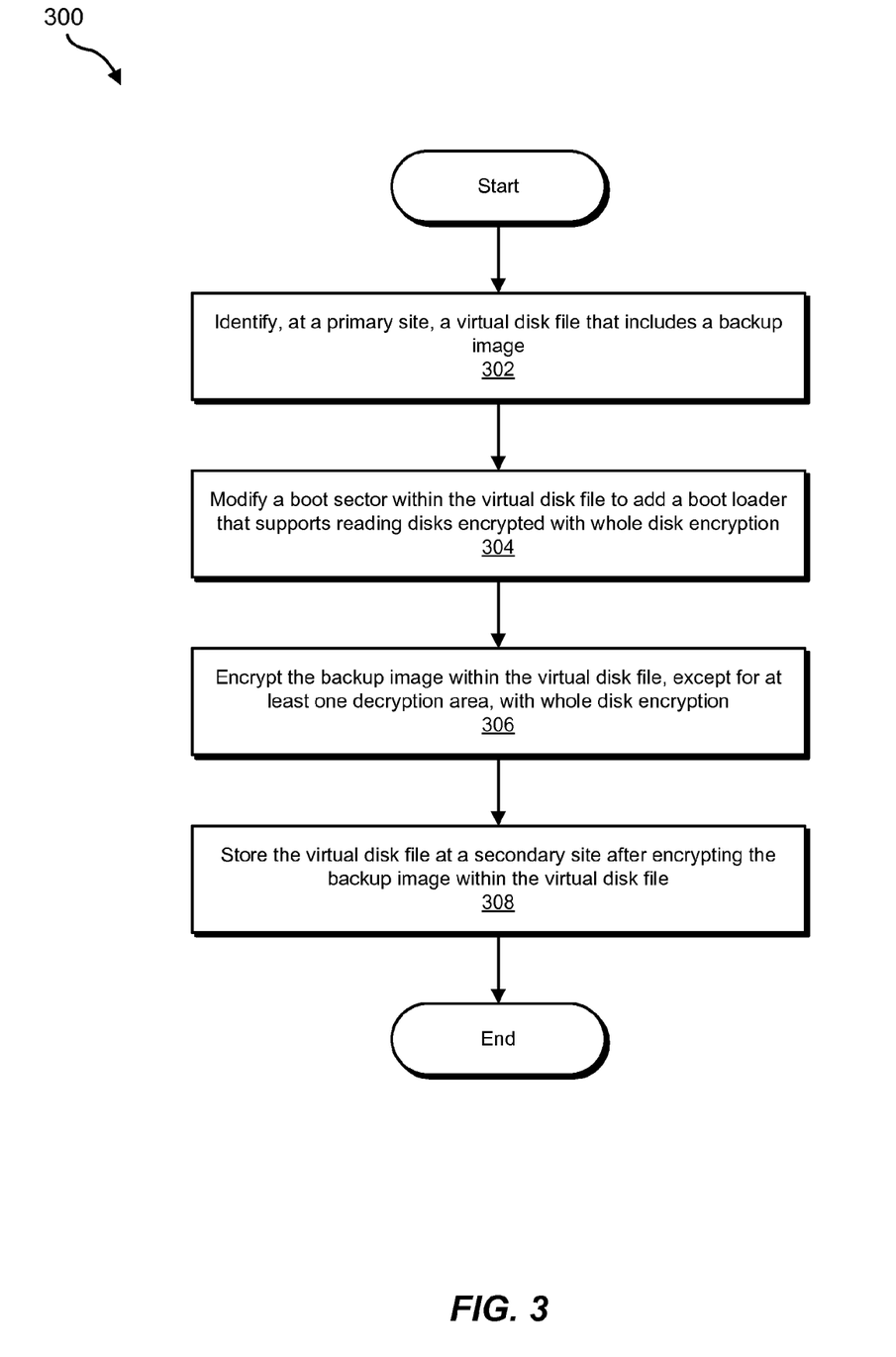
FIG. 3 is a flow diagram of an exemplary method for securely storing backup data while facilitating fast failovers.
Figure 4:
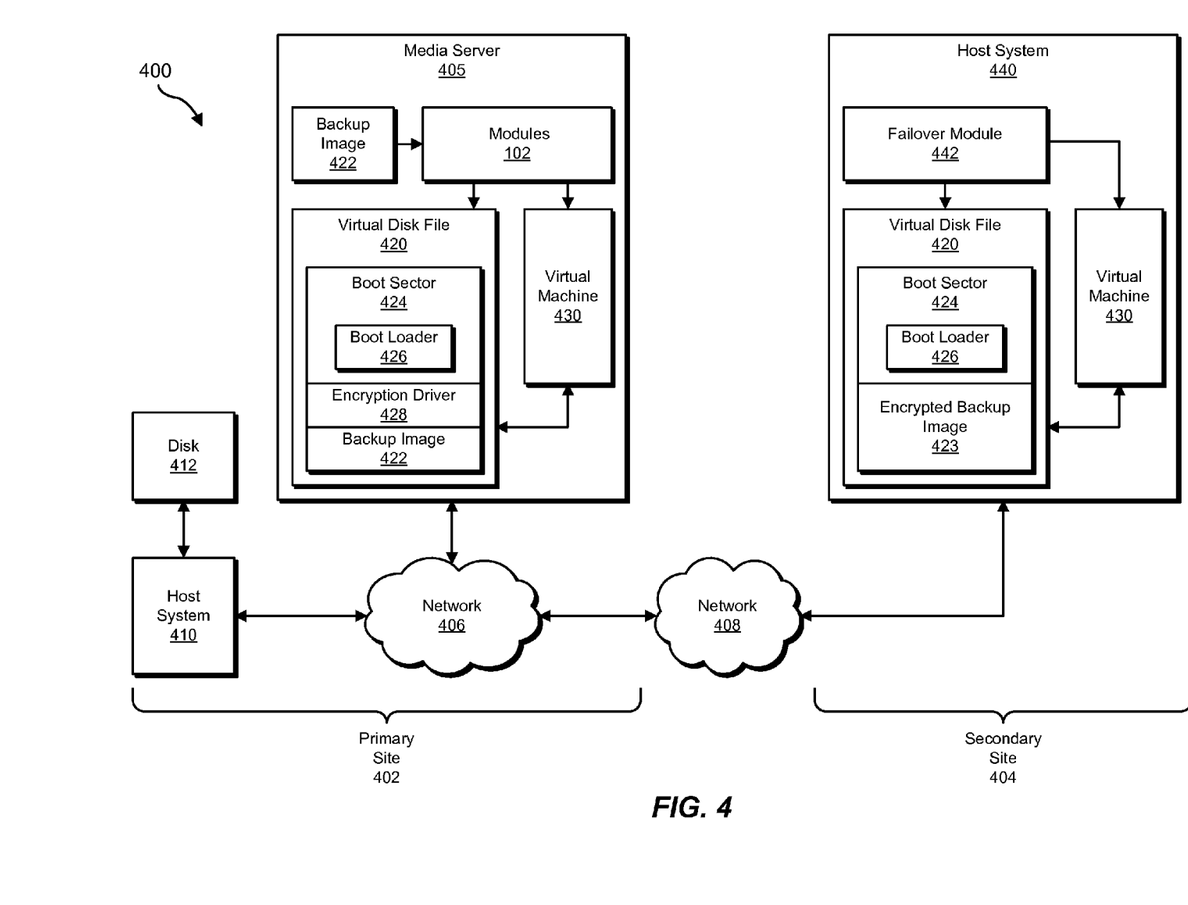
FIG. 4 is a block diagram of an exemplary system for securely storing backup data while facilitating fast failovers.

The following will provide, with reference to FIGS. 1, 2, and 4, detailed descriptions of exemplary systems for securely storing backup data while facilitating fast failovers. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for securely storing backup data while facilitating fast failovers. As illustrated in this figure, exemplary system 100 may include one or more modules 102 for performing one or more tasks. For example, and as will be explained in greater detail below, exemplary system 100 may include an identification module 104 programmed to identify, at a primary site, a virtual disk file that includes a backup image. Exemplary system 100 may also include a modification module 106 programmed to modify a boot sector within the virtual disk file to add a boot loader that supports reading disks encrypted with whole disk encryption.

In addition, and as will be described in greater detail below, exemplary system 100 may include an encryption module 108 programmed to encrypt the backup image within the virtual disk file, except for at least one decryption area, with whole disk encryption. Exemplary system 100 may also include a storage module 110 programmed to store the virtual disk file at a secondary site after encrypting the backup image within the virtual disk file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. Computing device 202 may be programmed with one or more of modules 102. Additionally or alternatively, computing device 206 may be programmed with one or more of modules 102.

In one embodiment, one or more of modules 102 from FIG. 1 may, when executed by at least one processor of computing device 202 and/or computing device 206, facilitate computing device 202 and/or computing device 206 in securely storing backup data while facilitating fast failovers. For example, and as will be described in greater detail below, one or more of modules 102 may cause computing device 202 and/or computing device 206 to 1) identify, at a primary site 210, a virtual disk file 220 that includes a backup image 222, 2) modify a boot sector 224 within virtual disk file 220 to add a boot loader 226 that supports reading disks encrypted with whole disk encryption, 3) encrypt backup image 222 within virtual disk file 220, except for boot sector 224, with whole disk encryption, and 4) store virtual disk file 220 at a secondary site 230 after encrypting backup image 222 within virtual disk file 220.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Computing device 206 generally represents any type or form of computing device capable of reading computer-executable instructions. Examples of computing device 206 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and computing device 206.

FIG. 3 is a flow diagram of an exemplary computer-implemented method 300 for securely storing backup data while facilitating fast failovers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify, at a primary site, a virtual disk file that includes a backup image. For example, at step 302 identification module 104 may, as part of computing device 202 in FIG. 2, identify, at primary site 210, virtual disk file 220 that includes backup image 222.

As used herein, the term "site" may refer to a geographical location, a network location, and/or a group of computing devices. The phrase "primary site" may refer to a site at which one or more applications may operate and/or at which one or more disks may be mounted before a failover. Additionally or alternatively, "primary site" may refer to a site that includes data that is backed up. Likewise, the phrase "secondary site" may refer to a site at which one or more applications may operate and/or at which one or more disks may be mounted after a failover. In some examples, a secondary site may refer to a site for storing data backed up from a primary site. Additionally or alternatively, a secondary site may refer to a site at which a virtual machine may operate in place of a physical and/or virtual machine previously operating a primary site.

As used herein, the phrase "virtual disk file" may refer to any file and/or image containing data in a format readable by and/or stored for the use of a virtual machine. In some examples, the data as stored within the virtual disk file may reflect the raw contents and/or structure of a virtual storage device or "virtual disk." Examples of virtual disk files include, without limitation, a VMWARE VIRTUAL MACHINE DISK file (a "VMDK file") and a VIRTUAL HARD DISK file (a "VHD file"). As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the phrase "backup image" may refer to any collection of data for protecting and/or preserving a collection of primary data. For example, the term "image" may refer to a file representing the contents of a storage device. Accordingly, the phrase "backup image" may refer to an image representing the contents of a storage device in accordance with a backup policy and/or operation applied to the storage device.

In some examples, the backup image may include a backup of a disk at the primary site. As used herein, the term "disk" may refer to any storage device, including a physical storage device and/or a virtual storage device. Accordingly, the backup image may include the backup of a physical storage device at the primary site and/or a virtual storage device (e.g., a virtual disk) at the primary site. In some examples, the backup image may include the backup of the disk of a host system within the primary site. For example, the systems and methods described herein may protect the host system via one or more backup operations and/or facilitate the failover of one or more applications of the host system to a secondary site.

Identification module 104 may identify the virtual disk file in any of a variety of contexts. For example, identification module 104 may identify the virtual disk file by identifying a backup policy that created the virtual disk file and/or that specifies that the virtual disk file is to be stored at a secondary site. In some examples, identification module 104 may identify the virtual disk file by identifying the creation of the virtual disk file. In some examples, identification module 104 may create the virtual disk file. For example, identification module 104 may back up an additional virtual disk file to create the virtual disk file. Additionally or alternatively, identification module 104 may back up a physical host system at the primary site to create the backup image. In these examples, identification module 104 may store the backup image within the virtual disk file.

FIG. 4 illustrates an exemplary system 400 for securely storing backup data while facilitating fast failovers. As shown in FIG. 4, exemplary system 400 may include a primary site 402 including a network 406 connecting a media server 405 and a host system 410 with a disk 412. Exemplary system 400 may also include a secondary site 404 including a host system 440. A network 408 may connect primary site 402 to secondary site 404. In some examples, identification module 104 may, as a part of media server 405, identify a virtual disk file 420. For example, identification module 104 may initiate a backup of disk 412 of host system 410, creating a backup image 422 of disk 412. Identification module 104 may place backup image 422 in a virtual disk format and/or a virtual disk container (e.g., virtual disk file 420). Additionally or alternatively, in some examples, at least a portion of one or more of these steps may be performed by and/or on host system 410.

Returning to FIG. 3, at step 304 one or more of the systems described herein may modify a boot sector within the virtual disk file to add a boot loader that supports reading disks encrypted with whole disk encryption. For example, at step 304 modification module 106 may, as part of computing device 202 in FIG. 2, modify boot sector 224 within virtual disk file 220 to add boot loader 226 that supports reading disks encrypted with whole disk encryption.

As used herein, the phrase "boot sector" may refer to any region of a storage device (e.g., including a virtual storage device) accessed during a bootstrap process (e.g., for one or more computer-executable instructions to execute during the bootstrap process). In some examples, the phrase "boot sector" may refer to a region of a storage device for storing a boot loader. As used herein, the phrase "boot loader" may refer to any program and/or set of instructions configured to execute as a part of a bootstrapping process. In some examples, the phrase "boot loader" may refer to a program that is executed before an operating system is loaded and/or to assist in loading an operating system.

As used herein, the phrase "whole disk encryption" (or "full disk encryption") may refer to any encryption practice involving encrypting a disk, including one or more applications and/or system files on the disk. In some examples, the phrase "whole disk encryption" may refer to encrypting the entire content of a disk. Additionally or alternatively, the phrase "whole disk encryption" may refer to encrypting all of a disk except for one or more portions of the disk used in a bootstrapping process (e.g., a master boot record, a boot loader, etc.).

Modification module 106 may add any suitable boot loader to the boot sector for supporting reading disks encrypted with whole disk encryption. For example, modification module 106 may modify the boot sector with a boot loader that takes a passcode as input and uses the passcode to decrypt a session key used for decrypting data stored on the disk.

In some examples, modification module 106 may also inject an encryption disk driver into the virtual disk file. The encryption disk driver may include any driver and/or filter driver capable of performing I/O on a whole-disk-encrypted image and/or volume. Additionally or alternatively, modification module 106 may modify the virtual disk file by storing metadata used for whole disk encryption in the virtual disk file. For example, modification module 106 may store authentication information and/or one or more encryption keys within the virtual disk file. For example, modification module 106 may store one or more usernames and/or passwords usable for decrypting a key for decrypting data within the whole-disk-encrypted backup image. Additionally or alternatively, modification module 106 may store information relating to one or more authentication servers (e.g., an authentication server on a secure private network that indicates a secure environment).

Using FIG. 4 as an example, at step 304 modification module 106 may, as a part of media server 405, modify a boot sector 424 within virtual disk file 420 to add a boot loader 426 that supports reading disks (e.g., including backup image 422) once encrypted with whole disk encryption.

Returning to FIG. 3, at step 306 one or more of the systems described herein may encrypt the backup image within the virtual disk file, except for at least one decryption area, with whole disk encryption. For example, at step 306 encryption module 108 may, as part of computing device 202 in FIG. 2, encrypt backup image 222 within virtual disk file 220, except for boot sector 224, with whole disk encryption.

Encryption module 108 may encrypt the backup image within the virtual disk file in any suitable context. For example, encryption module 108 may encrypt the backup image at the primary site. In some examples, encryption module 108 may encrypt the backup image at a media server at the primary site. In at least one example, encryption module 108 may determine, based on a security standard, that the backup image is to be encrypted before transmitting the backup image outside the primary site. For example, encryption module 108 may identify the security standard in a backup policy governing the creation and/or disposition of the backup image. Additionally or alternatively, encryption module 108 may identify the security standard in a configuration file and/or registry defining which data within the primary site must be encrypted before leaving the primary site. Accordingly, encryption module 108 may encrypt the backup image in response to determining that the backup is to be encrypted based on the security standard.

Encryption module 108 may encrypt the backup image in any of a variety of ways. For example, encryption module 108 may identify regions and/or volumes of the backup image for encryption and encrypt the selected regions and/or volumes. In some examples, encryption module 108 may mount the backup image (e.g., on a media server, on a host system that originated the backup image, etc.) and then encrypt the backup image. In some examples, encryption module 108 may encrypt the backup image using an encryption library and/or algorithm that matches an encryption library and/or algorithm injected into the virtual disk file (e.g., into an encryption disk driver such as encryption driver 428).

The one or more decryption areas may include any area and/or region of the backup image useful for accessing and/or decrypting the backup image after the backup image has been encrypted. For example, the decryption areas may include the boot loader, the boot sector, and/or one or more areas storing encryption-related metadata (e.g., authentication information, encryption keys, etc.).

Using FIG. 4 as an example, at step 306 encryption module 108 may encrypt backup image 422 by mounting virtual disk file 420 on media server 405 and encrypting backup image 422.

Returning to FIG. 3, at step 308 one or more of the systems described herein may store the virtual disk file at a secondary site after encrypting the backup image within the virtual disk file. For example, at step 308 storage module 110 may, as part of computing device 202 in FIG. 2, store virtual disk file 220 at secondary site 230 after encrypting backup image 222 within virtual disk file 220.

Storage module 110 may store the virtual disk file at the secondary site in any suitable manner. For example, storage module 110 may transmit the virtual disk file to the secondary site (e.g., with metadata identifying a storage device protected by the backup image within the virtual disk file and/or identifying one or more characteristics of a host system connected to the storage device protected by the backup image).

In some examples, one or more of the systems described herein may also 1) identify a failover from the primary site to the secondary site and 2) in response to the failover, load the backup image in a virtual machine at the secondary site. Using FIG. 4 as an example, a failover module 442 may, as a part of host system 440 (and/or as a part of host system 410, media server 405, and/or a separate administration server), identify a failover from primary site 402 to secondary site 404 and, in response to the failover, load the backup image (e.g., virtual disk file 420 including encrypted backup image 423) into virtual machine 430 at secondary site 404.

As used herein, the term "failover" may generally refer to any procedure and/or process for using a new device as a host device for an application in lieu of an old device that formerly hosted the application. In some examples, a failover may provide a continuity of service to one or more client applications and/or devices. For example, a client that accessed an application on an old device may continue to access the application on a new device after a failover. In some examples, a failover may be triggered following a failure on a computing device. For example, failover module 442 may identify a failure with host system 410 and/or disk 412 (e.g., an error that may interfere with the application), determine that the first computing system is overloaded (e.g., such that the application may not run correctly, reliably, and/or at a predetermined service level), and/or receive an instruction from an administrator to fail the application over (e.g., in order to allow maintenance on host system 410 and/or disk 412).

As explained above, by encrypting backup images on site and provisioning virtual disk files that include these encrypted backup images with boot loaders that support reading these encrypted backup images, the systems and methods described herein may enable the secure offsite storage of backup images while simultaneously facilitating the use of these backup images for fast failovers. For example, a backup system may create a backup image of a disk at a primary site, format the backup image as a virtual disk file, encrypt the backup image at the primary site, provision the virtual disk file with a boot loader for loading a system that uses whole disk encryption, and then store the virtual disk file at a secondary site. By encrypting the backup image before storing the virtual disk file at the secondary site, the data within the backup image may remain secure and/or adhere to one or more defined security policies. By provisioning the virtual disk file with a boot loader for handing whole disk encryption, the virtual disk file may be used quickly at the secondary site in case of a failover.

Accordingly, in some examples the systems and methods described herein may perform whole disk encryption for backup images stored in virtual disk containers when the backup images are to be copied and/or moved to offsite locations where the backup images may be transparently loaded into virtual machines and authenticated by authorized users. For example, because some computing devices may operate in secure environments (e.g., desktop computing devices that may not ordinarily leave the secure environment, as opposed to mobile computing devices), configuring these computing devices for whole disk encryption may be unnecessary and inefficient. However, because these computing devices may need backup and failover capabilities to offsite environments, these systems and methods may provide encryption for images created from these devices that allows for fast failovers.

Figure 5:
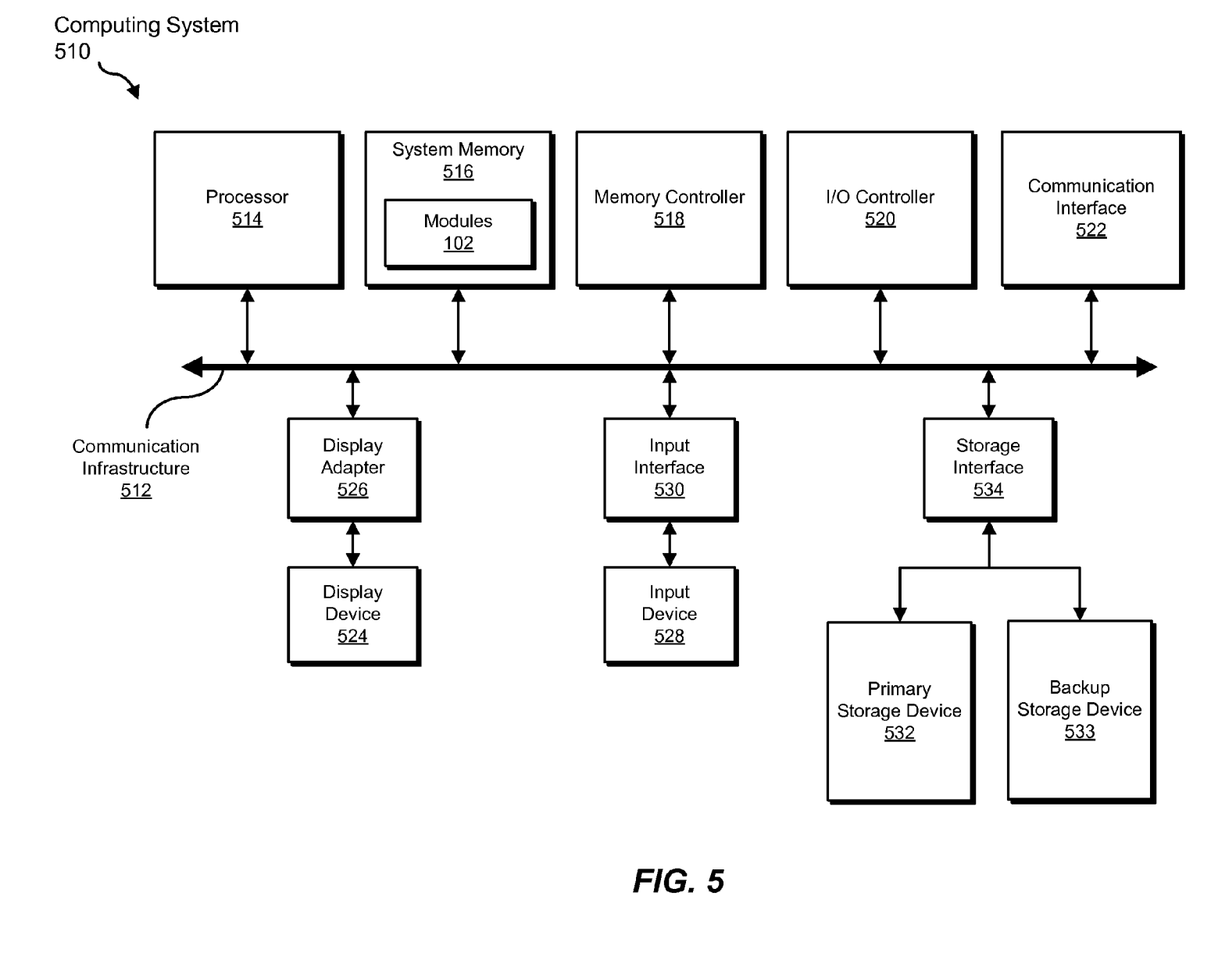
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, backing up, modifying, encrypting, mounting, injecting, determining, storing, and loading steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
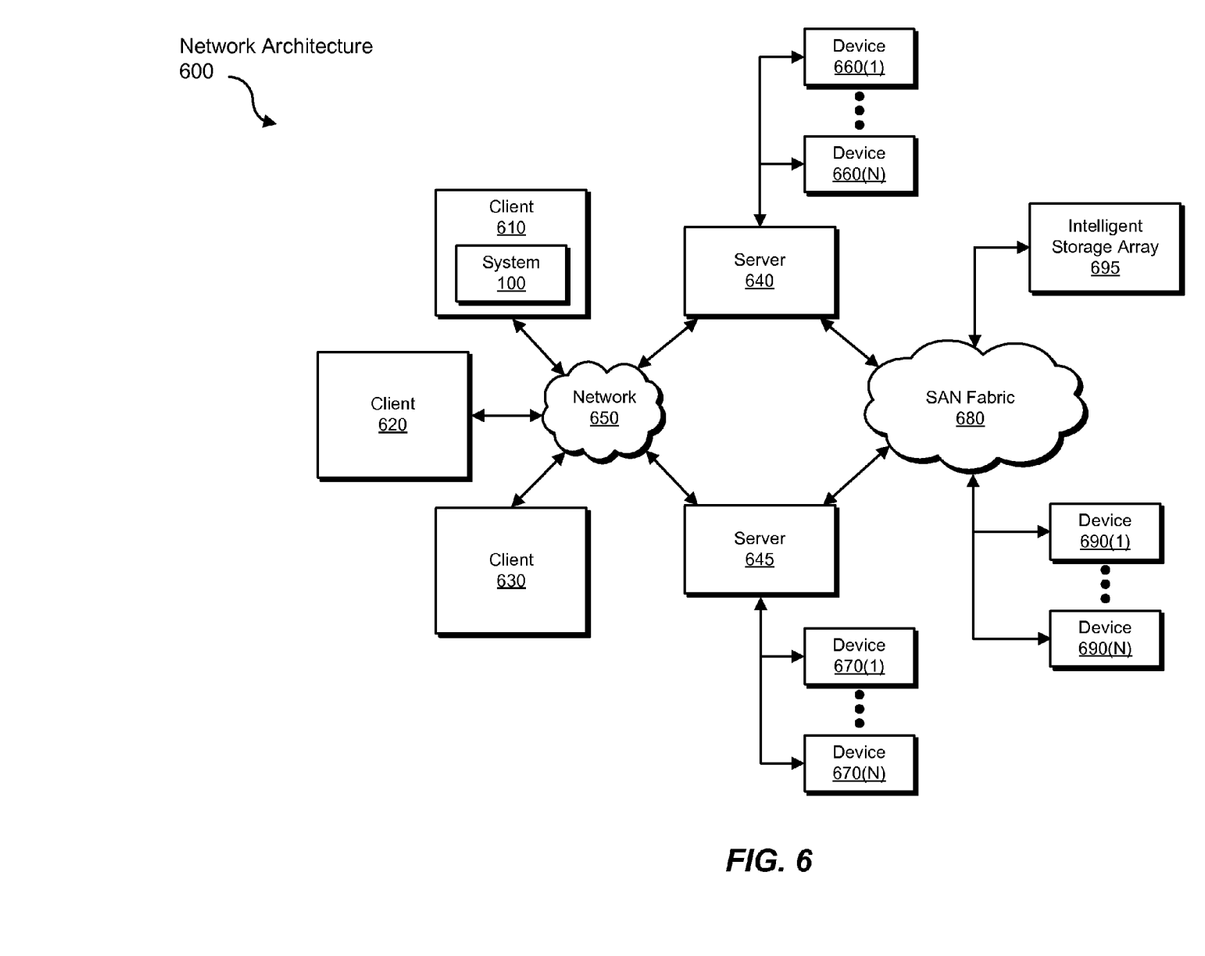
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, backing up, modifying, encrypting, mounting, injecting, determining, storing, and loading steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for securely storing backup data while facilitating fast failovers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a backup image to be transformed, transform the backup image by formatting it as a virtual disk file, encrypting its contents with whole disk encryption, and injecting a boot loader capable of facilitating the use of disks encrypted with whole disk encryption. These modules may output the result of the transformation to a media server, use the result of the transformation to securely store backup data offsite while enabling use of the backup data for fast failovers, and store the result of the transformation at a failover site. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securely storing backup data while facilitating fast failovers, at least a portion of the method being performed by a computing device comprising at least one processor, the method comprising:
   identifying, at a primary site, a virtual disk file that comprises a backup image comprising a backup of a disk at the primary site;
   modifying a boot sector within the virtual disk file to add a boot loader, wherein:
      the boot loader executes as part of a bootstrapping process;
      the boot loader facilitates decrypting disks encrypted with whole disk encryption;
   encrypting, at the primary site, the backup image within the virtual disk file, except for at least one decryption area comprising one or more portions of the disk at the primary site used in the bootstrapping process, with whole disk encryption;
   storing the virtual disk file at a secondary site after encrypting the backup image within the virtual disk file.

2. The computer-implemented method of claim 1, wherein adding the boot loader comprises adding a boot loader that takes a passcode as input and uses the passcode to decrypt a session key used for decrypting data stored on the disk.

3. The computer-implemented method of claim 1, wherein:
   the backup of the disk at the primary site comprises the backup of the disk of a host system within the primary site;
   encrypting the backup image at the primary site comprises encrypting the backup image at a media server at the primary site.

4. The computer-implemented method of claim 1, wherein encrypting with whole disk encryption comprises encrypting all of the disk at the primary site except for the one or more portions of the disk of the primary site used in the bootstrapping process.

5. The computer-implemented method of claim 1, further comprising injecting an encryption disk driver into the virtual disk file.

6. The computer-implemented method of claim 1, further comprising determining, based on a security standard, that the backup image is to be encrypted before transmitting the backup image outside the primary site;
   wherein encrypting the backup image is in response to determining that the backup is to be encrypted based on the security standard.

7. The computer-implemented method of claim 1, wherein identifying the virtual disk file comprises backing up an additional virtual disk file to create the virtual disk file.

8. The computer-implemented method of claim 1, wherein identifying the virtual disk file comprises backing up a physical host system at the primary site to create the backup image.

9. A system for securely storing backup data while facilitating fast failovers, the system comprising:
   an identification module, stored in memory, that identifies, at a primary site, a virtual disk file that comprises a backup image comprising a backup of a disk at the primary site;
   a modification module, stored in memory, that modifies a boot sector within the virtual disk file to add a boot loader, wherein:
      the boot loader executes as part of a bootstrapping process;
      the boot loader facilitates decrypting disks encrypted with whole disk encryption;
   an encryption module, stored in memory, that encrypts, at the primary site, the backup image within the virtual disk file, except for at least one decryption area comprising one or more portions of the disk at the primary site used in the bootstrapping process, with whole disk encryption;
   a storage module, stored in memory, that stores the virtual disk file at a secondary site after encrypting the backup image within the virtual disk file;
   at least one processor configured to execute the identification module, the modification module, the encryption module, and the storage module.

10. The system of claim 9, wherein:
    the modification module modifies the boot sector to add the boot loader by modifying the boot sector to add a boot loader that takes a passcode as input and uses the passcode to decrypt a session key used for decrypting data stored on the disk.

11. The system of claim 9, wherein:
    the backup of the disk at the primary site comprises the backup of the disk of a host system within the primary site;
    the encryption module is programmed to encrypt the backup image at a media server at the primary site.

12. The system of claim 9, further comprising a failover module, stored in memory, that:
    identifies a failover from the primary site to the secondary site;
    in response to the failover, loads the backup image in a virtual machine at the secondary site.

13. The system of claim 9, wherein the modification module further injects an encryption disk driver into the virtual disk file.

14. The system of claim 9,
    wherein the encryption module further determines, based on a security standard, that the backup image is to be encrypted before transmitting the backup image outside the primary site;
    wherein the encryption module encrypts the backup image in response to determining that the backup is to be encrypted based on the security standard.

15. The system of claim 9, wherein the identification module identifies the virtual disk file by backing up an additional virtual disk file to create the virtual disk file.

16. The system of claim 9, wherein the identification module identifies the virtual disk file by backing up a physical host system at the primary site to create the backup image.

17. A non-transitory computer-readable medium comprising one or more computer-executable instructions that, when executed by at least one processor of a computing device, cause the computing device to:
    identify, at a primary site, a virtual disk file that comprises a backup image comprising a backup of a disk at the primary site;
    modify a boot sector within the virtual disk file to add a boot loader, wherein:
       the boot loader executes as part of a bootstrapping process;
       the boot loader facilitates decrypting disks encrypted with whole disk encryption;
    encrypt, at the primary site, the backup image within the virtual disk file, except for at least one decryption area comprising one or more portions of the disk at the primary site used in the bootstrapping process, with whole disk encryption;
    store the virtual disk file at a secondary site after encrypting the backup image within the virtual disk file.

18. The non-transitory computer-readable medium of claim 17, wherein:
the one or more computer-executable instructions cause the computing device to add the boot loader by causing the computing device to add a boot loader that takes a passcode as input and uses the passcode to decrypt a session key used for decrypting data stored on the disk.

19. The non-transitory computer-readable medium of claim 17, wherein:
the backup of the disk at the primary site comprises the backup of the disk of a host system within the primary site;
the one or more computer-executable instructions cause the computing device to encrypt the backup image at the primary site by causing the computing device to encrypt the backup image at a media server at the primary site.

20. The non-transitory computer-readable medium of claim 17, wherein the one or more computer-executable instructions further cause the computing device to:
identify a failover from the primary site to the secondary site;
in response to the failover, load the backup image in a virtual machine at the secondary site.

\* \* \* \* \*